(12) United States Patent
Thomas et al.

(10) Patent No.: US 6,939,259 B2
(45) Date of Patent: Sep. 6, 2005

(54) TWO-SHOT UNIFIED CHAIN TENSIONER ARM OR GUIDE

(75) Inventors: Chris Thomas, Ithaca, NY (US); Scott Kobylarz, Ithaca, NY (US); Brad Adams, Homer, NY (US)

(73) Assignee: BorgWarner Inc., Auburn Hills, MI (US)

( * ) Notice: Subject to any disclaimer, the term of this patent is extended or adjusted under 35 U.S.C. 154(b) by 180 days.

(21) Appl. No.: 10/423,574

(22) Filed: Apr. 25, 2003

(65) Prior Publication Data

US 2004/0214672 A1 Oct. 28, 2004

(51) Int. Cl.[7] ................................................. F16H 7/08
(52) U.S. Cl. ...................................... 474/111; 474/140
(58) Field of Search .............................. 474/101, 109, 474/111, 119, 133, 140

(56) References Cited

U.S. PATENT DOCUMENTS

| 4,832,664 | A |   | 5/1989  | Groger et al. ............... | 474/111 |
| 5,045,032 | A |   | 9/1991  | Suzuki et al. ................ | 474/140 |
| 5,820,502 | A |   | 10/1998 | Schulze ........................ | 474/140 |
| 6,013,000 | A | * | 1/2000  | Moretz ........................ | 474/111 |
| 6,036,613 | A |   | 3/2000  | Diehm ........................ | 474/111 |
| 6,612,952 | B1 | * | 9/2003  | Simpson et al. ............. | 474/111 |
| 6,634,974 | B2 |  | 10/2003 | Fujiwara et al. ............ | 474/111 |
| 6,758,777 | B2 | * | 7/2004  | Young ........................ | 474/140 |
| 2002/0042315 | A1 | * | 4/2002 | Poiret ......................... | 474/111 |
| 2004/0067806 | A1 | * | 4/2004 | Markley et al. ............. | 474/110 |

FOREIGN PATENT DOCUMENTS

| DE | 197 14763 C1 | 4/1997 | ............. F16H/7/08 |
| DE | 101 23396 A  | 2/2002 | ............. F16H/7/18 |

OTHER PUBLICATIONS

Handbook of Materials Selection, 2002, John Wiley and Sons, p. 337.*
Marks' Standard Hanbook For Mechanicla Engineers, 1996, McGraw–Hill, Tenth Edition, Table 6.1.9.*

* cited by examiner

Primary Examiner—David A. Bucci
Assistant Examiner—Vicky A. Johnson
(74) Attorney, Agent, or Firm—Brown & Michaels, PC; Greg Dziegielewski

(57) ABSTRACT

A device such as a chain tensioner arm and the method of forming the same are provided. The device includes a top wearing member and a bottom structural member, in which the device is produced by forming the top wearing member and the bottom structural member in a single molding cycle.

8 Claims, 8 Drawing Sheets

TWO-SHOT UNIFIED CHAIN TENSIONER ARM OR GUIDE

BACKGROUND OF THE INVENTION

1. Field of the Invention

The invention pertains to the field of chain tensioners or guides. More particularly, the invention pertains to a two-shot unified chain tensioner arm or guide.

2. Description of Related Art

Chain tensioner arms and guides are known to be used in internal combustion engines. In a typical engine with one or more overhead camshafts because the distance from the camshaft to the crankshaft is increased, it is essential to incorporate in the timing chain system guiding and tensioning elements so as to ensure that chain tension is maintained within acceptable limits.

Because these guiding elements are in continuous contact with the moving chain, the elements need wear-resistance and have frictional characteristics. They cause neither degradation of the contact surfaces nor timing drive system inefficiencies. Additionally because in some instances the contact forces between the chain and the guide or tensioner arm can be substantial, they must possess substantial structural strength so as to withstand these contact forces.

Typically one of the contact element material solutions involves using a nylon 6/6 type surface because of its superior friction, wear, and high temperature characteristics. However this form of material does not have the structural integrity to handle forces transmitted from the chain to the guiding system components or the forces applied from the tensioner arm to the chain. A common solution to this issue is to have a metallic or fiber reinforced plastic structural member—cast iron, die-cast aluminum, glass filled nylon or stamped steel—for supporting the nylon contact surface. This method requires then to either assemble the structure or wear surface into a final part. Alternatively, the method requires completely finishing the structure element and then inserting it in a mold and thereby producing the contact surface on top of the structure element. In either case the dissimilarity of the materials results in some unique problems that are difficult to overcome because of the assembly process and dissimilar expansion characteristics of the material involved. In addition, the cost of these non-unified assemblies is relatively high.

With regard to assembly issues, it is noted that not only the tolerances of the mating elements must be carefully considered, but also the structural integrity of the interface must be maintained both at room temperature and at elevated engine operating temperatures. Additionally because the materials are dissimilar, their expansion and contraction characteristics will differ, thereby at temperature extremes, special stresses may occur due to physical constraints. Alternatively, because the interfaces between the materials are physically altered due to the occurrence that one of the elements may have expanded or contracted by an amount greater than its mating counterpart.

U.S. Pat. No. 4,832,664 teaches a guide rail, and method of making same, for the guiding and/or tightening of chains that are used in internal-combustion engines, for example, for driving camshafts, auxiliaries or the like is disclosed. For reasons concerning weight and manufacturing, the guide rail consists of a plastic material and is formed by a slideway lining body and a carrier. Both the carrier and the slideway lining body are produced in a progressive manufacturing cycle and are interconnected via one or several dovetailed connections.

However, the above guide rail, and method of making same requires two separate steps of molding. The method requires the need to remove the carrier parts from the mold after a first step. Then in a separate step, the slideway lining s molded over the carrier. Having the two separate steps has its disadvantages. They include: two separate devices for forming each piece such as two separate molding devices, or at least the need to remove the parts from the mold after the first step is required; and lastly significant outlay of cost and space for making the tensioner arm or the guide.

Therefore, there is a need to combine the two steps using the same basic molding equipment using a special mold which can produce the final product without the need to remove the parts from the mold after the first step.

SUMMARY OF THE INVENTION

The objective of this disclosure to produce the tensioning and guiding components by means of a two-shot molding process using compatible materials that can be molded using the same basic molding equipment using a special mold which can produce the final product without the need to remove the parts from the mold after the first step.

It is a further objective of this disclosure to produce tensioning and guiding components that provide adequate structural integrity while minimizing cost and space.

A further objective of the disclosure is to provide a means of dealing with differential thermal expansion between the filled and unfilled members whereby internal stresses that may cause distortion (e.g. creep) or structural failure would not be induced.

Accordingly, a device used with a chain is provided. The device includes: a structure element having a first end and a second end, the second end being structurally stronger than the first end, the structure element further comprising a top surface spanning the first end and the second end, the top surface having a predetermined thickness; a wearing element having a first surface and a second surface, the first surface disposed to engage a chain, the second surface being physically bonded with the top surface with allowance for relative movement between the top surface and the second surface; the top surface structure element including a set of openings disposed to receive a set of connecting elements of the wearing element, wherein the connecting elements protrude from the second surface and has portions of the same extending completely through the set of openings; and the set of openings being of bigger size than the connecting elements thereby allowing for relative movements between the structure element and the wearing element.

Accordingly, a method for making the device is provided. The method includes the steps of: providing a single forming device; providing a structure element having a first end and a second end, the second end being structurally stronger than the first end, the structure element further comprising a top surface spanning the first end and the second end, the top surface having a predetermined thickness; providing a wearing element having a first surface and a second surface, the first surface disposed to engage a chain, the second surface being physically bonded with the top surface with allowance for relative movement between the top surface and the second surface; within a single molding cycle, molding the structure element and the wearing element using the same molding device; and combining the structure element with the wearing element within the single molding cycle.

BRIEF DESCRIPTION OF THE DRAWING

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

This section includes the descriptions of the present invention including the preferred embodiment of the present invention for the understanding of the same. It is noted that the embodiments are merely describing the invention. The claims section of the present invention defines the boundaries of the property right conferred by law.

Figure 1:
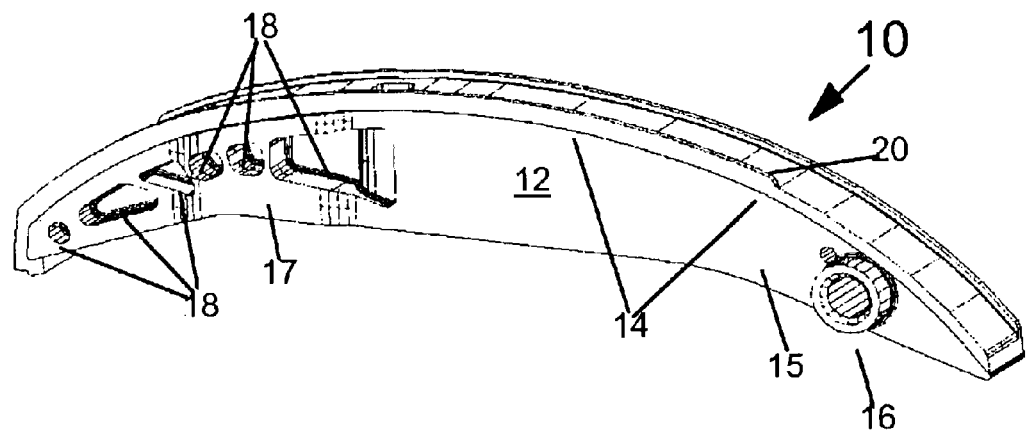
FIG. 1 shows a perspective view of the present invention wherein a 2-shot molded part in which no component assembly is required other than the 2-shot molding.

Referring to FIG. 1, a 2-shot molded part 10 in which no component assembly is required is shown. A structure element 12 forms the base of the 2-shot molded part 10. Structure element 12 has a generally elongated shape and includes a top wearing surface 14 along the longitudinal length of the same. Structure element 12 may be made of glass-filled plastic or polymer structure. A connecting member 16 having an annular opening for pivotal coupling to a stationary member (not shown) which is stationary in relation to the chain is provided at a first end 15 of structure element 12. A suitable connecting member (not shown) such as a bolt or dowel pin may be transposed through connecting member 16 for coupling to the stationary member. Along a second end 17 of structure element 12, recesses 18 are formed on both sides of the structure element 12 (only one side shown).

A wearing element 20 formed of a material having more elasticity or less rigidity as compared with structure element 12 is provided. Wearing element 20 may be made of polymer material such as plastic without glass reinforcement. Wearing element 20 has a shape that traces or follows the generally elongated shape of structure element 12. Wearing element 20 further includes a first surface 22 and a second surface 24. First surface 22 is disposed to be in contact with a chain (not shown) thereby keeping the chain at a suitable tension. Second surface 24 is disposed to be in physical contact with top surface 14 of structure element 12. It is pointed out that there is no chemical bonding between wearing element 20 and structure element 12 even if both elements (12, 20) are made of polymer materials. Wearing element 20 is divided into a first end 25 and a second end 27. First end 25 structurally corresponds to the first end 15 of wearing element 20. Second end 27 structurally corresponds to the second end 17 of wearing element 20.

A set of connecting elements 26 is formed on the first end 15 of wearing element 20. Elements 26 protrude from second surface 24 for extending through openings 30 formed on top surface 14 (refer to FIG. 1B). It is noted that top surface 14 possesses a suitable thickness for connecting elements 26 to extend completely therethrough and may permit a top portion (see FIG. 2A) to physically affix wearing element 20 and structure element 12 together.

Figure 1A:
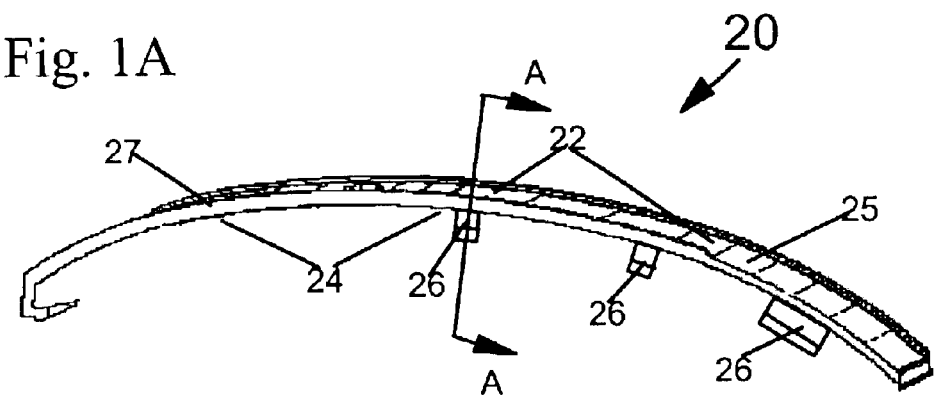
FIG. 1A shows a perspective view of the top portion or wearing element of FIG. 1.
Figure 1B:
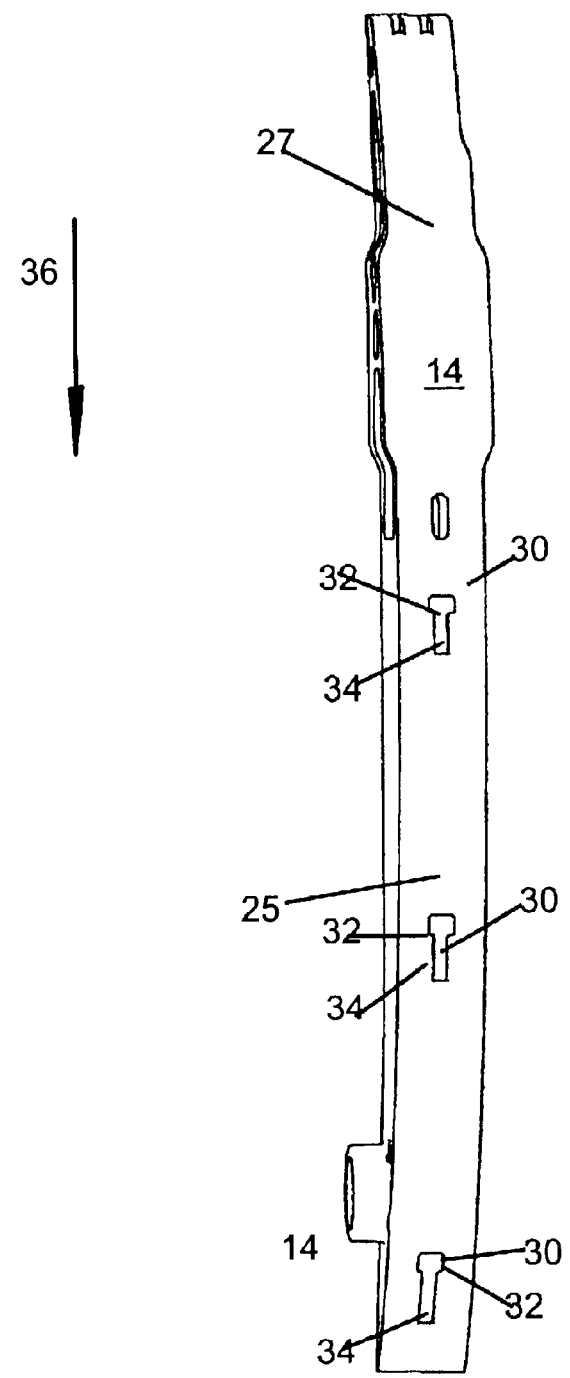
FIG. 1B shows a top perspective view of the present invention wherein top surface of the structure element of FIG. 1 is shown.

Referring to FIG. 1B, a top perspective view of the present invention wherein top surface of the structure element of FIG. 1 is shown. Openings 30 include an entering portion or region 32 and a locking portion or region 34. Entering portion 32 is provided for the initial entering of connecting elements 26, wherein the top portion extends completely through opening 30. After the top portion completes the extension, a sideway movement along arrow 36 is performed whereby the top portion of connecting elements 26 move into the locking region 34.

As can be appreciated, relative physical movements between wearing element 20 and structure element 12 are permitted due to the size difference between connecting elements 26 and openings 30.

An exemplified method of forming the tensioner of the present invention involves the use of a glass-filled plastic structure element 12 having top surface 14. The structure element is molded (e.g. injection molded) as a first step into a structural bracket, which in turn, is partly cured. Before the structural bracket is completely cured, wearing element 20 is formed thereopen, in which the contact face 22 with a chain is molded on the top surface 14 preferably using plastic without glass reinforcement on top of the top surface 14.

The present invention further teaches a tensioner arm and method of making the same to produce tensioning arm and chain guiding components that provide adequate structural integrity while minimizing cost and space. In order to incorporate adequate strength and rigidity to the structural bracket element 12 the cross section of the same is preferably in the form of an I-beam. However when attempting to mold an element in the shape of an I-beam, mold tooling actuation is such that only a limited number of elements can be molded at the same time thus rendering the process commercially less feasible. A more suitable design from a molding standpoint is to incorporate a U-shape bracket. However such a shape is not as strong as needed to withstand the stresses that the part is ultimately subjected to.

Referring back to FIGS. 1 and 1B, first end 15 of structure element 12, to overcome the aforementioned deficiencies the present invention teaches a structure element 12 which incorporates a cross section that is partly I-beam and partly U-shape. In other words, structure element 12 which is a single physical member having a first end 15 that is U-shape and a second end 17 that is I-beam is provided. By using the I-beam construction in the highly stressed area such as the second end 17 of structure element 12 and the U-shape in the lower stressed area of the bracket 12, the simultaneous molding of an adequate number of elements are possible. See FIG. 2.

It is noted that the shape of the structure element 12 are not limited to U-shape and I-beam. element 12 may be a combination of at least two of the following shapes: U-shape, I-beam, H-beam, E-shaped, and other suitable structure formations.

Figure 2:
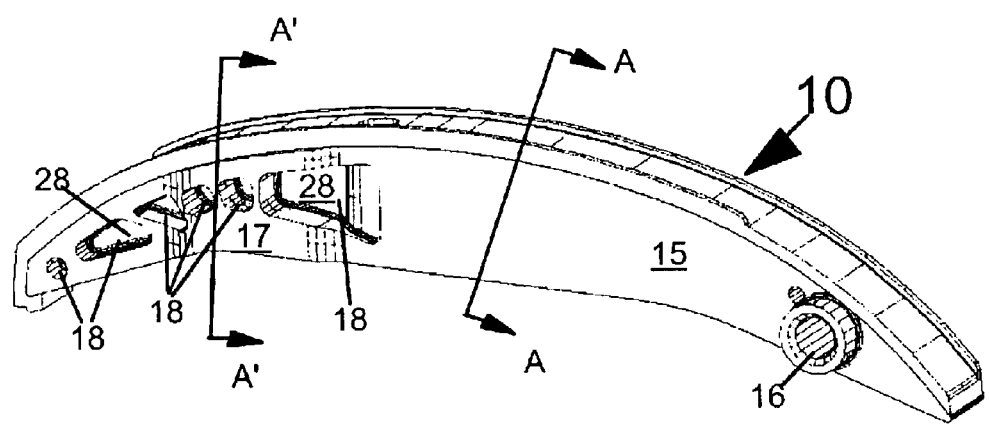
FIG. 2 shows a 2-shot molded part of the present invention in which a combination of U and I beam construction is employed.

Referring to FIG. 2, a pivoted tensioner 12 similar to the one shown in FIG. 1 is depicted. Tensioner 12 may be subdivided into two simultaneously formed structures. The first structure is the above described I-beam. As can be seen, the recesses 18 are formed on each side of the second end 17 (only one side shown). A center portion 28 which forms part of the structure of the second end 17 is also part of the I-beam. One reason for the I-beam structure is that for a pivotal chain tensional, more structure integrity is required at the second end 17 as compared to the first end 15 of structure element 12. As can be appreciated, the location of the I-beam is determined by actual implementation of the present invention.

It is noted that in the present embodiment, a pivoted chain tensioner arm is shown. However, the present invention contemplates teaching other types of chain tensioner arms and chain guides with the two-shot molding process using compatible materials that can be molded using the same basic molding equipment using a special mold which can produce the final product without the need to remove the parts from the mold after the first step.

It is further noted that both members of the tensioner arm, i.e., structure 12 and wearing element 20, are molded in a single cycle using the same molding tool.

Figure 2A:
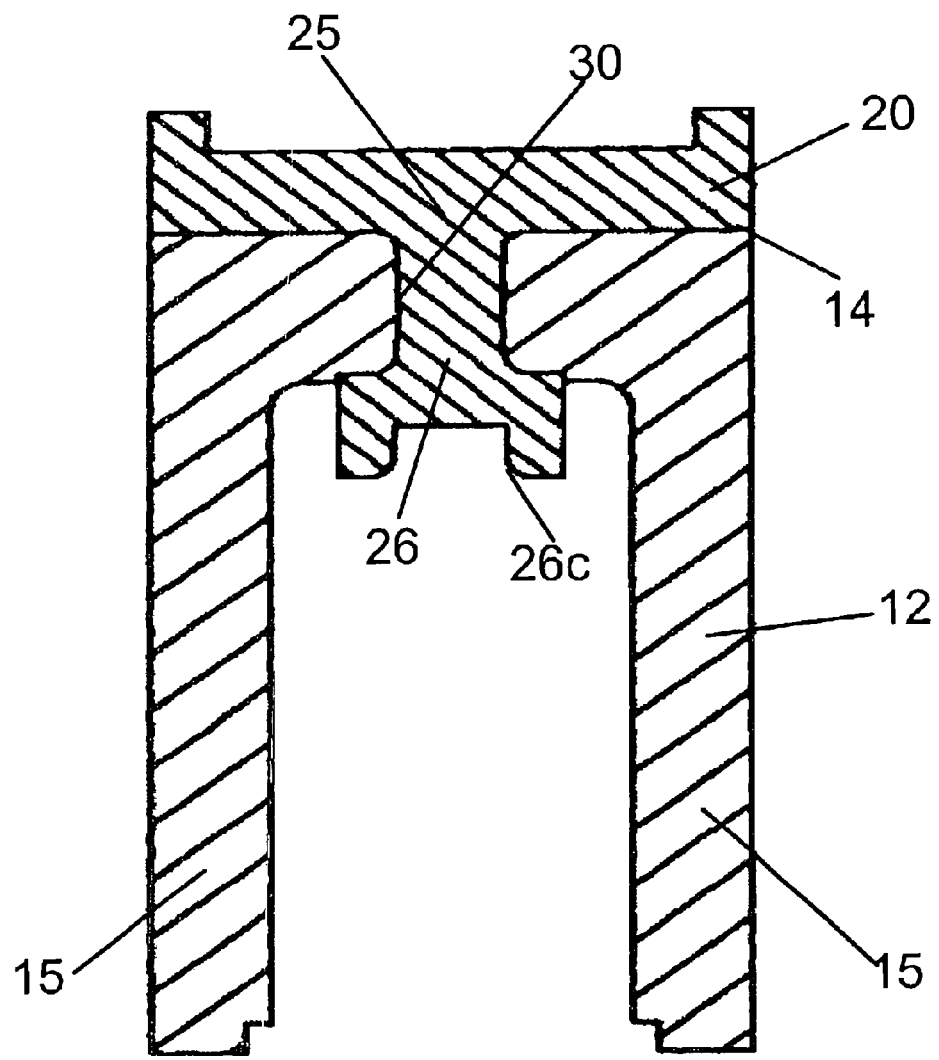
FIG. 2A shows a sectional view of A—A of FIGS. 1A and 2, in which the connection of a top, wearing portion with a bottom structure portion of the tensioner arm or guide is shown at the U-beam constructed section.

Referring to FIG. 2A, a sectional view of A—A of FIGS. 1A and 2, in which the connection of a top portion with a bottom portion of the tensioner is shown. The top portion may be the wearing element 20. The bottom portion may be the structure element 12. At the U beam construction portion or first end 15, a U-shaped (or N-shaped for this particular depiction) structure is provided. First end 15 of structure element 12 corresponds to the first end 25 of wearing element 20. In the present sectional view, connecting elements 26 each has a tip 26c that extends completely past the top surface 14.

Figure 2B:
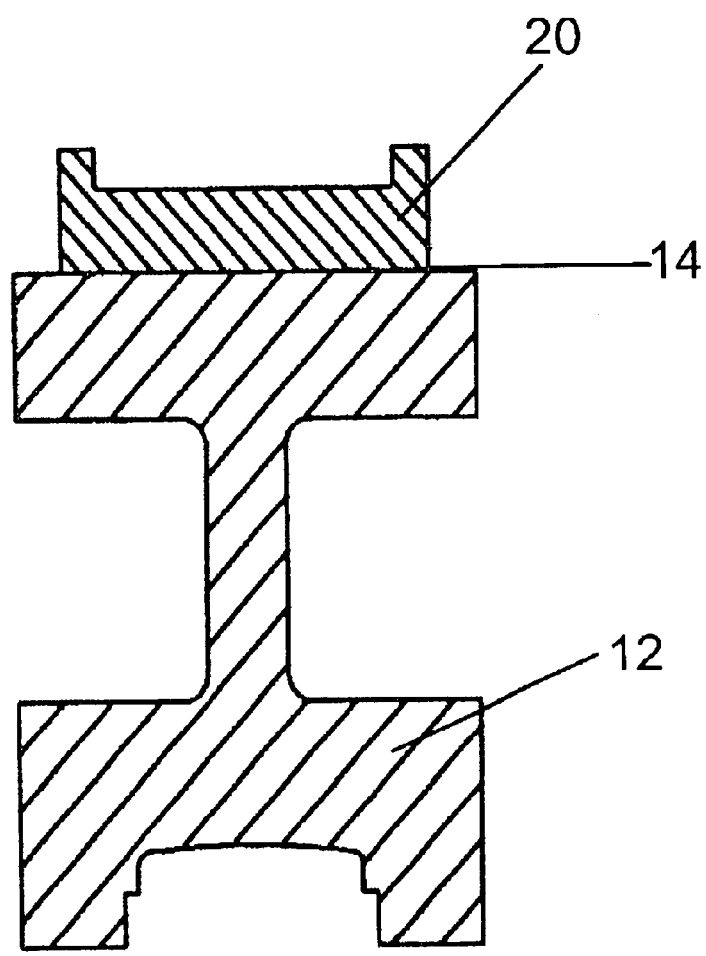
FIG. 2B shows a sectional view of A—A of FIGS. 1A and 2, in which the connection of a top, wearing portion with a bottom structure portion of the tensioner arm or guide is shown at the I-beam constructed section.

Referring to FIG. 2B, a sectional view of A'—A' of FIG. 2 is shown. In the present section, structure element 12 has the I-beam formation. Top surface 14 of structure element 12 is in close physical contact or physical bonding with a corresponding surface of wearing element 20. The two surfaces are preferably formed to be suitable for bonding such as flat formation.

A means for dealing with differential thermal expansion between the filled and unfilled members is provided whereby internal stresses that may cause distortion or structural failure would not be induced. Composite materials may be used for the members in alternative embodiments of the present invention. The interlock design shown in the FIGS. 3(A–C) provides clearances between elements of the first and second molding steps that are present under all temperature conditions, thus accommodating differential expansion and contraction without inducing stress on the elements.

Figure 3A:
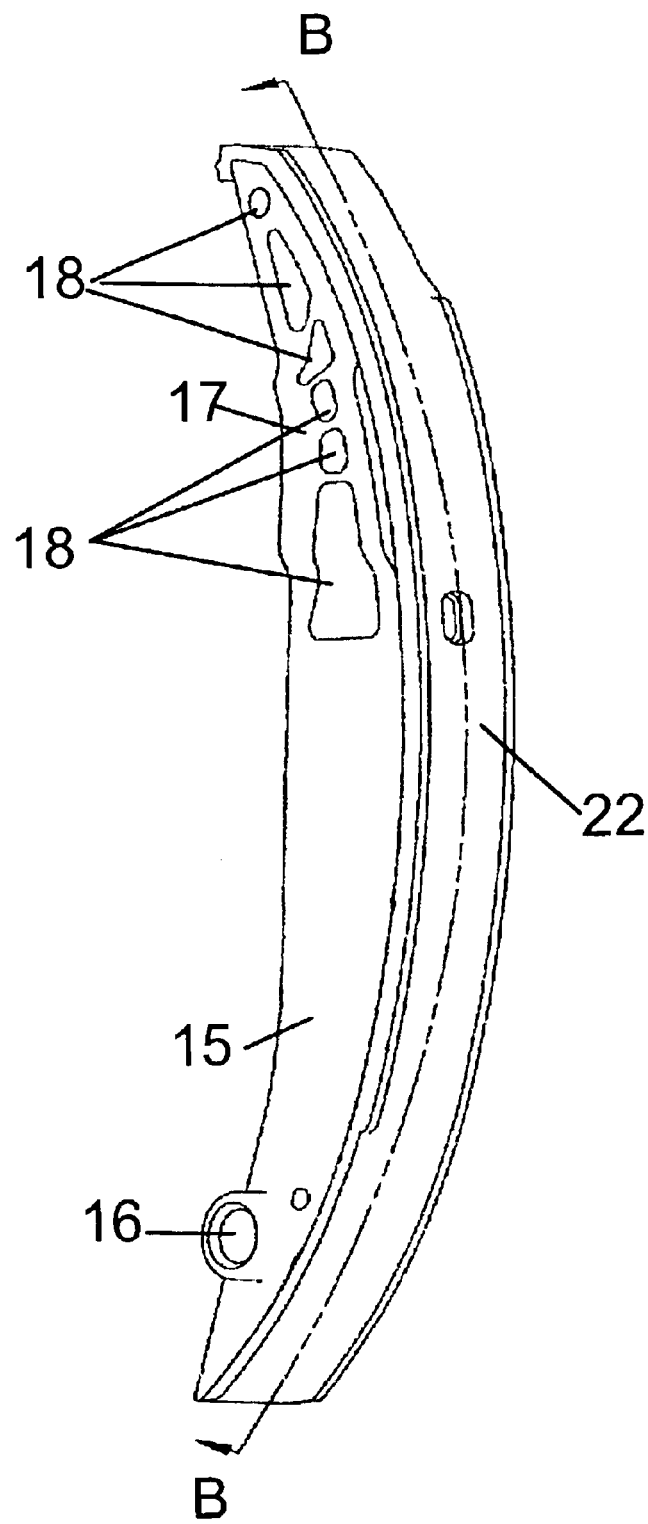
FIG. 3A shows a perspective view of a 2-shot molded part interlock design of the present invention that accommodates and does not resist thermal expansion.

Referring to FIG. 3A, a perspective view of a 2-shot molded part interlock design of the present invention that accommodates and does not resist thermal expansion. The numerals of FIG. 3A correspond to the same in previous figures.

As can be appreciated, creep occurs in various materials and creep causes the shape of a member to change. In some embodiments of the present invention, the thermal characteristics between members are different. For example, structure element 12 and wearing element can be considered as the different members having different thermal characteristics. If the two are subjected to engine operating conditions wherein temperature varies, it is desirable to reduce the creep effect. The following teaches a set of gaps 40, 50 for overcoming the creep effect.

Figure 3B:
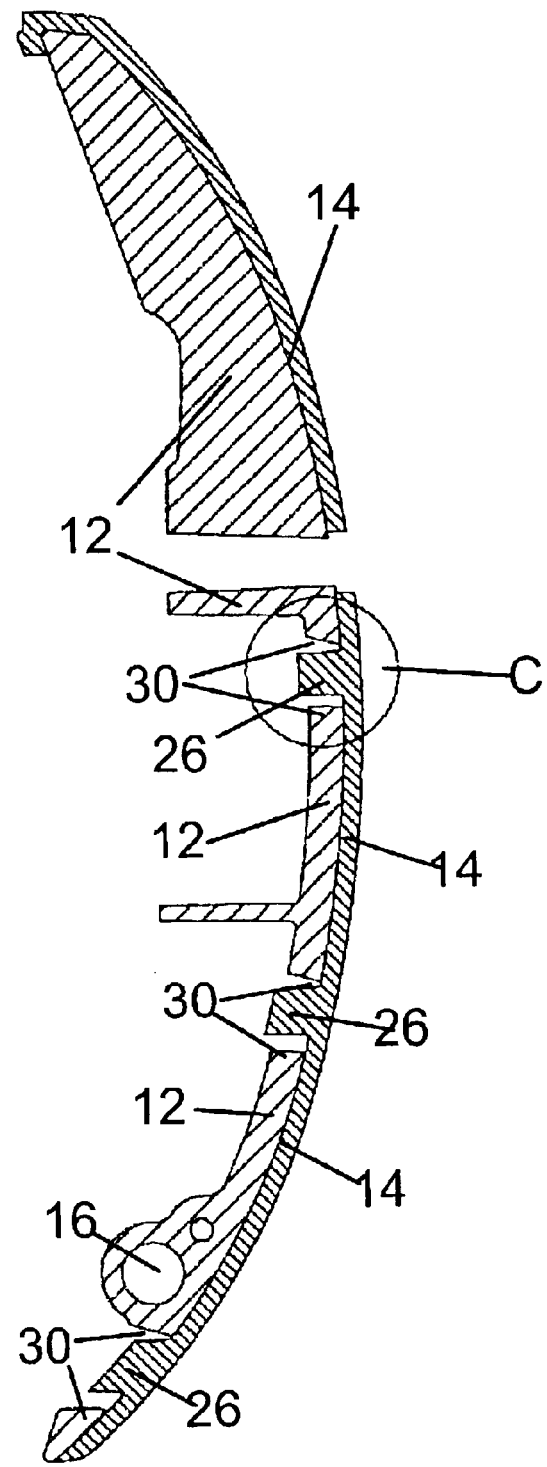
FIG. 3B shows a sectional cut view along B—B of FIG. 3A.
Figure 3C:
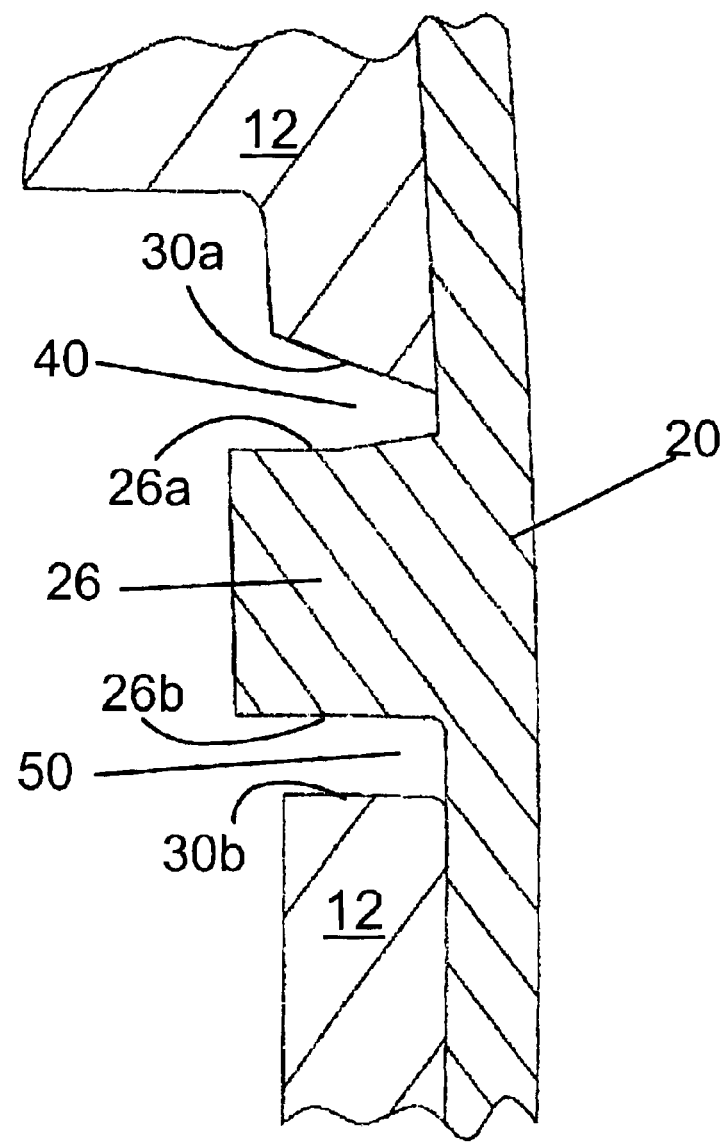
FIG. 3C shows an enlarged view of circle C of FIG. 3B.

Referring to FIG. 3B, a sectional cut view along B—B of FIG. 3A is shown. The numerals of FIG. 3B correspond to the same in previous figures.

Referring to 3C, an enlarged view of circle C of FIG. 3B is shown. Connecting element 26 of wearing element 20 extends through opening 30 of structure element 12. A first gap 40 is formed between a first surface 30a of opening 30 and a first end 26a of connecting element 26. A second gap 50 is formed between a second surface 30b of opening 30 and a second end 26b of connecting element 26. As can be seen, gaps 40 and 50 allow different thermal expansion or contraction between structure element 12 and wearing element 20. It is noted that there is no chemical bonding between structure element 12 and wearing element 20.

As can be seen from FIG. 3B, similar gaps are formed on the other two openings 30 and connecting elements 26.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A device used with a chain comprising:

a structure element having a first end and a second end, the second end being structurally stronger than the first end, the structure element comprising a top surface spanning the first end and the second end, the top surface having a predetermined thickness; and a wearing element having a first surface and a second surface, the first surface disposed to engage a chain, the second surface being physically bonded with the top surface of the structure element with allowance for relative movement between the top surface of the structure element and the second surface of the wearing element;

wherein the top surface of the structure element includes a plurality of openings disposed to receive a plurality of connecting elements of the wearing element, wherein the connecting elements protrude from the second surface of the wearing element and at least a portion of each of the connecting elements extend completely through the openings; and wherein the openings are larger than the connecting elements thereby allowing for relative movements between the structure element and the wearing element.

2. The device of claim 1, wherein the device is a pivoting chain tensioner, and the structure element further comprises a pivoting point.

3. The device of claim 1, wherein the device is a chain guide.

4. The device of claim 1, wherein the first end is formed of a U-shaped structure.

5. The device of claim 1, wherein the second end is formed of an I-beam structure.

6. The device of claim 1, wherein the structure element comprises a material of higher density than the material comprising the wearing element.

7. The device of claim 1, wherein the wearing element is made of polymer material.

8. The device of claim 1, wherein the structure element is made of polymer material.

* * * * *